United States Patent [19]

Stoev et al.

[11] 4,000,086

[45] Dec. 28, 1976

[54] METHOD OF AND APPARATUS FOR EMULSIFICATION

[75] Inventors: Stoycho Mitrev Stoev; Boris Nikolov Ninov; Stancho Ivanov Stanchev; Ivan Mitrev Sapunarov; Alexi Stoyanov Bogdanov; Vladko Hristov Panov, all of Sofia, Bulgaria

[73] Assignee: Vish Minno-Geoloshki Institute - Nis, Sofia, Bulgaria

[22] Filed: Apr. 28, 1975

[21] Appl. No.: 572,095

[52] U.S. Cl. ................................ 252/312; 252/314; 252/359 D; 259/DIG. 42

[51] Int. Cl.[2] ..................... B01J 13/00; B01F 11/00

[58] Field of Search .............. 252/312, 314, 359 D; 259/DIG. 42

[56] References Cited

UNITED STATES PATENTS

| | | | |
|---|---|---|---|
| 1,956,293 | 4/1934 | Klein et al. | 252/314 |
| 3,546,129 | 12/1970 | Berg et al. | 252/314 X |

FOREIGN PATENTS OR APPLICATIONS

| | | | |
|---|---|---|---|
| 516,341 | 1/1940 | United Kingdom | 252/314 |

*Primary Examiner*—Richard D. Lovering

[57] ABSTRACT

Method of and apparatus for emulsification of oils assuring obtaining the desired dispersion and stability of emulsions.

Vibration action is applied to cells containing water and oils so as to subject the cell and their contents to energy impulses varying in accordance with sine curves, thereby dispersing oil into fine drops which are evenly distributed throughout the system. The apparatus includes a plurality of serially mounted emulsion cells forming a unitary closure, the closure being mounted on a fixed support through springs. A vibration device is mounted upon the enclosure so as to vibrate it as described. Between the successive cells in the enclosure there are disposed grids or sieves, and vibration actuated valves having valve elements which function somewhat in the manner of diaphragm pumps.

4 Claims, 1 Drawing Figure

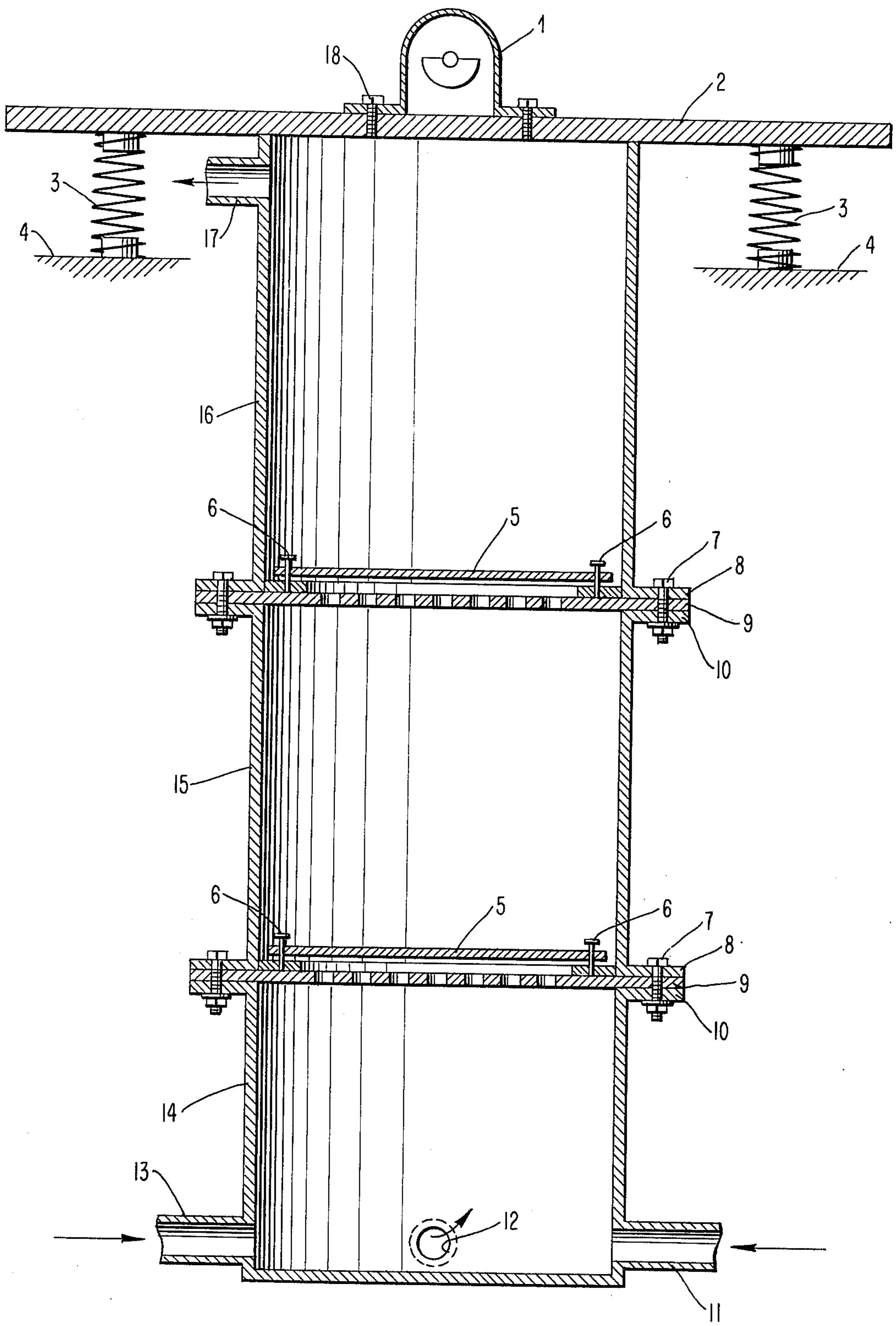
1
2
18
3
3
4
4
17
16
6
5
6
7
8
9
10
15
6
5
6
7
8
9
10
14
13
12
11

METHOD OF AND APPARATUS FOR EMULSIFICATION

This invention relates to a method of and apparatus for emulsifying oils, the method and apparatus assuring the obtaining of the required dispersion and stability of the resulting emulsions.

Different methods for emulsification are known. Among these are the condensation method, the dispersion method, accoustical and vibro-accoustical methods, etc. The vibro-accoustical method has the advantage of assuring the obtaining of fine emulsions, while the remaining ones permit the obtaining of only coarse-dispersed emulsions, and are of low output. The vibro-accoustical method, however, has some disadvantages, such as high capital investment is required, high energy consumption when it is employed under industrial conditions, and comparatively low output.

There are a number of known constructions of apparatus for carrying out the above-cited known method. These include mechanical mixers, homogenizers, colloidal mills, and sonic and ultrasonic generators. All of these types of constructions are complicated, have a relatively low output, and have a high energy consumption.

The present invention has among its objects the provision of a method of and an apparatus for emulsification wherein the above-cited disadvantages of prior methods and apparatus are obviated.

The method of the invention operates by applying vibration action on a mixture of water and oils, resulting in energy impulses which are applied thereto and which vary in accordance with sine curves. Such energy impulses disperse the oil into fine drops which are evenly distributed throughout the liquid system.

The apparatus of the invention includes an enclosure having a plurality of emulsion cells therein disposed in series, the enclosure being supported on a fixed foundation of chassis through the medium of interposed springs. One or more vibrators is attached to the enclosure so as to vibrate it and the cells enclosed therein, as well as the liquid contents of the cells. Between each pairs of cells there are disposed a grid and a valve having a movable valve element which is driven by the energy impulses so as to function in the manner of a diaphragm pump. In the disclosed embodiment there are three cells contained in the enclosure, the lowermost cell being a mixing cell and the two upper cells being emulsion cells. The lower-most cell is provided with inlet conduit means for the oil and water, whereas the upper-most cell is provided with an emulsion discharge conduit means.

In the accompanying drawing, which shows a preferred embodiment of the apparatus of the invention:

The single FIGURE is a schematic view in vertical cross section through the emulsifier.

In the drawing there is shown an enclosure having a lowermost mixing cell 14 and two serially disposed upper emulsion cells 15 and 16. The successive cells forming the enclosure are connected by flanges 8 and 10 which are connected by a series of bolts 7. Between the flanges 8 and 10 there is disposed a horizontal grid 9. The upper flange 8 has a broad central aperture overlying the perforations in the grid 9, the portion of the flange 8 within the side wall of the respective cells serving as a supporting frame for the movable valve element 5 of a valve. The valve element 5 is guided for free vertical movement on a series of headed guide rods 6. When the vibrator, to be described, is at rest, the movable valve elements 5 lie in a lower position in engagement with the supporting frame therefor, so as to shut off communication between successive cells. When, however, the vibrator is operated the valve elements 5 as well as the other parts of the enclosure receive sine-wave energy impulses which cause the valve elements 5 to reciprocate in a vertical direction, thereby functioning somewhat as a diaphragm pump.

The enclosure containing the above-described cells 14, 15 and 16 has a relatively heavy plate 2 forming the upper end of the enclosure, the plate 2 having laterally extending portions or wings between which there are interposed coil compression springs 3 the lower end of which are supported upon a fixed foundation or chassis 4. A vibrator 1 is shown mounted upon the upper surface of the plate 2 and is secured thereon by machine screws 18. The lower-most, mixing cell 14 is supplied with a plurality of inlet conduit means, three such inlet conduits being shown at 11, 12, and 13. Oil is introduced into the mixing cell 14 through at least one of such inlet conduit means, and water is introduced thereinto through at least one of the remaining inlet conduit means. At the upper end of the upper emulsion cell 16 there is disposed an emulsion discharge conduit means 17. The conduit means 11, 12, 13 and 17 are preferably connected to flexible pipes such as hoses, so as not unduly to damp the vibrations imposed upon the enclosure by the vibrator 1. Fluid is sucked through one of the inlet conduit means 11, 12 and 13 into the mixing cell 14 by the action of the apparatus, now to be described. Each of the inlet conduit means 11, 12 and 13 is provided with a check valve (not shown) which allows the ingress of water, oil and air through the respective inlet conduit means for preventing the escape of liquid therethrough.

The vibrator 1 is of a known construction and subjects the enclosure and the cells 14, 15 and 16 to vibrations in a plurality of directions. The vibrator 1 shown employs a driven shaft journalled in a structure secured to the enclosure, there being an eccentrically disposed weight secured to the shaft.

The above-described apparatus operates as follows: When the vibrator 1 is energized, the whole enclosure including the cells 14, 15 and 16 formed therein and the contents of the cells are placed in a forced oscillatory or reciprocatory movement. As a result of the vibrations of the movable valve elements 5 a vacuum occurs in the lower-most cell 14, and water, oil and air are sucked into such cell through the respective inlet conduit means 11, 12 and 13. The air, after being dispersed into large bubbles, creates conditions which are favorable for oil dispersion. Due to the vibration of the water-oil-air system, the oil in passing through the apertures in the grid plates 9 is dispersed into fibers, which when passing from one cell upwardly to the next are dispersed not only by the grids 9 but also by the mechanical shocks imposed thereon by the recriprocating valve elements 5. The process of oil dispersion continues in cell 15 because of the mechanical vibrations imparted to the oil-water-air medium. Such process of dispersion also continues while passing upwardly from cell 15 into cell 16. The final emulsion produced in the upper emulsion cell 16 is discharged through the emulsion discharge conduit means 17.

In accordance with the method of the present invention the vibrator 1 is operated so as to subject the water-oil-air system to a vibration frequency of 10–200 Hz, the amplitude of the vibration applied to the cells lying between 0.1 and 9 mm.

Emulsification of the oil-water system is improved by putting vibration balls (not shown) in one or more of the cells 14, 15 and 16. Such balls, receiving vibrations from the vibrator 1 via the enclosure and the walls and bottoms of the cells therein, in turn impart vibrations to the oil-water system in contact with them.

This application is related to application Ser. No. 572,456, filed Apr. 28, 1975, entitled METHOD OF AND APPARATUS FOR MINERAL PROCESSING; application Ser. No. 572,342, filed Apr. 28, 1975, entitled VIBRO-ACOUSTICAL EXTRACTION APPARATUS; and, application Ser. No. 572,457, filed Apr. 28, 1975, entitled MATERIAL TREATING APPARATUS INCLUDING PNEUMO-HYDRAULIC VIBRATOR, all co-assigned with the present application and filed of even date by Stoev et al.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A method of emulsification of oil and water comprising introducing a mixture of water, oil and air into a first, mixing cell, passing such mixture through a perforated plate into a second, emulsion cell, and subjecting the water-oil-air medium in both the mixing cell and the emulsion cell to a vibration action having a frequency of 10–200 Hz and an amplitude of 0.1 – 9 mm, the water-oil-air medium being subjected to mechanical shock by impulse-actuated reciprocating valve elements disposed adjacent said perforated plate and functioning as diaphragm pumps to suck the medium through the openings in the plate said cells being sealed off from each other by said valve elements when the latter are not vibrated.

2. An apparatus for the emulsification of oil, comprising an enclosure containing serially-disposed cells the first of which is a mixing cell and the second of which is an emulsion cell, the enclosure being supported by springs, a vibrator mounted upon the enclosure, a perforated plate and at least one valve element spanning the enclosure and forming the boundary between successive cells and guide means permitting the valve element to move through a limited vertical path between its lower, completely-closed position and its upper, completely-open position said valve element remaining in its completely-closed position when said enclosure is not being vibrated by means of said vibrator.

3. Apparatus according to claim 2, further comprising balls contained in the successive cells, such balls being subjected to mechanical vibration imposed thereon by the vibrator and improving the emulsification of the water-oil medium.

4. Apparatus according to claim 3, further comprising a plurality of medium-feeding pipes connected to the lower end of the lowermost, mixing cell, and at least one discharge conduit to the upper end of the uppermost, emulsion cell.

* * * * *